United States Patent [19]

Bonnes et al.

[11] Patent Number: 5,033,261

[45] Date of Patent: Jul. 23, 1991

[54] LAWN RAKE HAVING REPLACEMENT TINES

[75] Inventors: David R. Bonnes, Westerville; Philip J. Male, Columbus, both of Ohio

[73] Assignee: The Union Fork & Hoe Company, Columbus, Ohio

[21] Appl. No.: 501,849

[22] Filed: Mar. 30, 1990

[51] Int. Cl.$^5$ .............................................. A01D 7/06
[52] U.S. Cl. ............................ 56/400.17; 56/400.21
[58] Field of Search ........... 56/400.01, 400.16, 400.17, 56/400.21

[56] References Cited

U.S. PATENT DOCUMENTS

| | | |
|---|---|---|
| D. 263,367 | 3/1982 | Fodor et al. . |
| D. 293,196 | 12/1987 | Germain et al. . |
| 1,925,357 | 9/1933 | Withington . |
| 2,156,480 | 5/1939 | Owen . |
| 2,193,070 | 3/1940 | Lambert . |
| 2,205,827 | 6/1940 | Brooke . |
| 2,313,691 | 3/1943 | Whittenberger . |
| 2,315,021 | 3/1943 | Schmidt et al. . |
| 2,463,393 | 3/1949 | Key . |
| 2,468,376 | 4/1949 | Peeples . |
| 2,490,710 | 12/1949 | Rugg . |
| 2,587,424 | 2/1952 | Zeman . |
| 2,663,987 | 12/1953 | Biener . |
| 2,672,006 | 3/1954 | Melvin . |
| 2,716,857 | 9/1955 | Melvin . |
| 2,794,312 | 6/1957 | Finkes . |
| 2,836,032 | 5/1958 | Melvin . |
| 2,850,865 | 9/1958 | Anderson . |
| 3,192,696 | 7/1965 | Hurry . |
| 3,332,223 | 7/1967 | Polisso . |
| 3,626,678 | 12/1971 | Quam . |
| 3,707,835 | 1/1973 | McNally et al. . |
| 3,724,188 | 4/1973 | Eads . |
| 4,215,528 | 8/1980 | Fodor . |
| 4,219,993 | 9/1980 | Cosmos . |
| 4,520,620 | 6/1985 | Kunz et al. . |
| 4,573,311 | 3/1986 | Ipema et al. . |
| 4,744,208 | 5/1988 | King . |
| 4,831,815 | 5/1989 | Bonnes . |
| 4,848,073 | 7/1989 | Germain et al. . |

FOREIGN PATENT DOCUMENTS

| | | |
|---|---|---|
| 63392 | 4/1945 | Denmark .......................... 56/400.21 |
| 510519 | 10/1930 | Fed. Rep. of Germany . |
| 673188 | 2/1939 | Fed. Rep. of Germany . |
| 224904 | 12/1942 | Switzerland . |
| 345761 | 5/1960 | Switzerland . |

*Primary Examiner*—William P. Neuder
*Attorney, Agent, or Firm*—Vorys, Sater, Seymour & Pease

[57] ABSTRACT

The present invention is directed generally to improved lawn and garden rakes. The rake includes a rake head assembly having locking ramp means connected by flexibly resilient rake web means for releasable cooperation with portions of the tines so as to releasably retain the latter so as to facilitate tine replacement.

10 Claims, 2 Drawing Sheets

LAWN RAKE HAVING REPLACEMENT TINES

BACKGROUND OF THE INVENTION

The present invention is directed to lawn and garden rakes in general and more particularly to lawn and garden rakes having replaceable tines.

Lawn and garden rakes include a plurality of tines attached to a body portion. Often such tines can bend and break during use or storage. Consequently, it is desirable to replace them in a simplified and expeditious manner. A number of different approaches have been suggested for effecting the replacement of the tines from the rake head assembly; such as described in U.S. Pat. Nos. 2,193,070; 2,205,827 and 4,215,528. For example, in the latter patent, there is disclosed an arrangement which requires bending of the tine during replacement. Such a requirement, however, limits the strength of the tines which can be used. There is, however, a continuing desire to improve upon such known devices.

SUMMARY OF THE INVENTION

Directed to achieving the foregoing objective, a rake, according to the present invention, is provided with an improved rake head assembly. The rake head assembly includes a rake body assembly operatively cooperating with a plurality of tines, each of which is formed with a locking recess. The rake body assembly includes channel means for defining a plurality of slots for the slidable reception of individual tines in each slot. The rake body includes coupling means being operable for the selective and releasable coupling of the tines in each of the slots. The coupling means includes a flexibly resilient ramping means and a locking means. The ramping means includes a ramp surface, which upon engagement with the tine during insertion of the latter deflects to allow the tine to ride thereover and allows the locking means to releasably lock into the recess of the tine.

In an illustrated embodiment, the resiliently flexible ramping means includes a resiliently flexible web integrally associated with the ramp and the rake head body. The flexible web portion deflects in response to the tine engaging the ramp during insertion of the tine in the slot. For effecting disengagement of the tines, a suitable tool or the like is used to deflect the web and thereby allow the tine to be withdrawn from the slot.

Among the other objects and features of the present invention, are the provisions for an improved rake head assembly which includes a plurality of replaceable tines; the provision of improved rake head assembly which facilitates a simplified and effective releasable retention of the tines; provision for an improved rake head assembly of the above noted type which includes a simplified and integral coupling means; the provision for an improved rake head assembly wherein the integral coupling means is a resiliently flexible web integrally formed with the rake head body; the provision for an improved rake head assembly of the above noted type which is economical to manufacture; and the provision for an improved rake including the above noted rake head assembly.

Still other objects and further scope of applicability of the present invention will become apparent from the detailed description to follow when taken in conjunction with the accompanying drawings in which like parts are designated by like reference numerals throughout of the several views.

DETAILED DESCRIPTION

Figure 1:
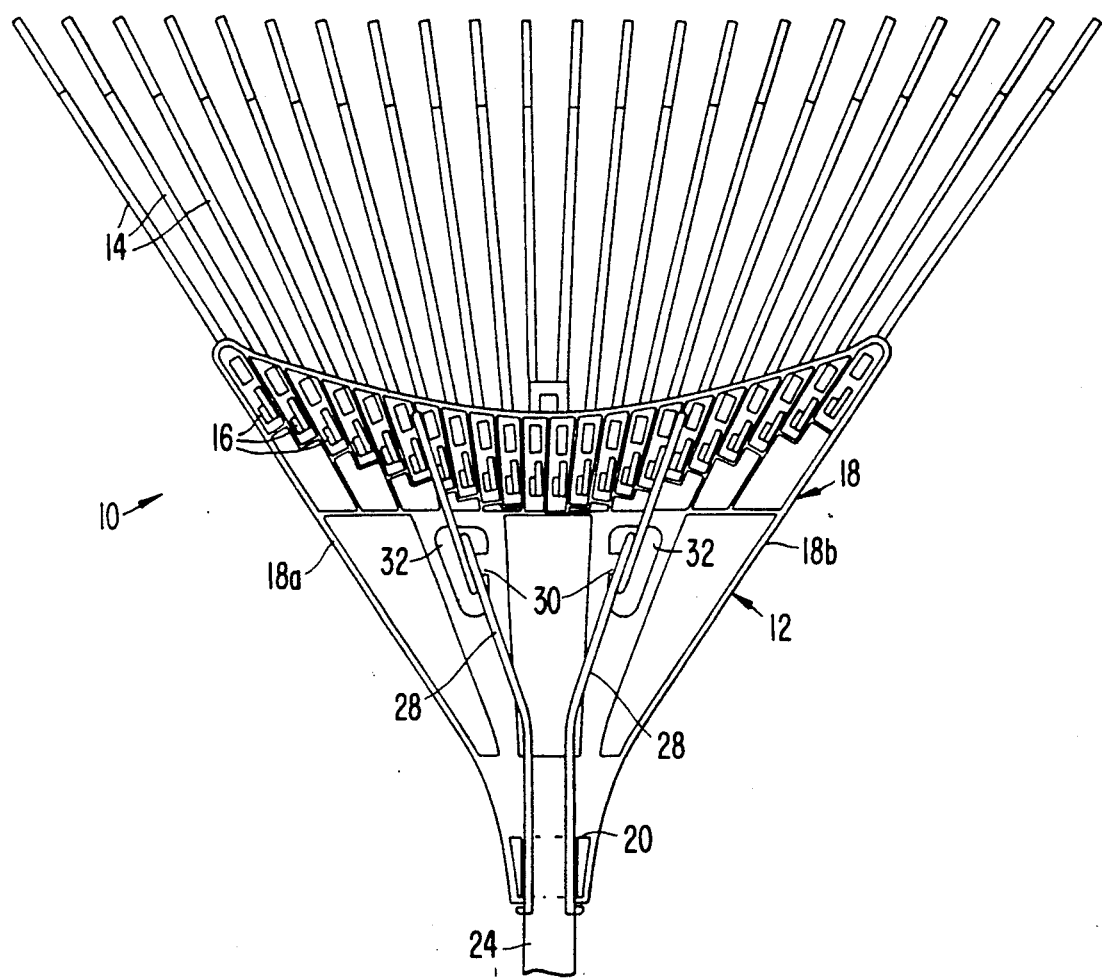
FIG. 1 is a plan view of a rake head assembly of the present invention.

Reference is now made to the drawings and, in particular, to FIGS. 1–4 for illustrating the improved rake head assembly 10 of the present invention. Initial reference is made to FIG. 1 which shows the rake head assembly 10 as including a rake head body 12 and the plurality of tines 14 which are removably associated therewith. As will be described in connection with this embodiment, the tines 14 are releasably held to the rake body 12 by coupling means 16 associated with the head assembly 10 so as to enhance significantly the releasable retention and replacement of the tines.

The rake head body 12 is, preferably, molded as a single, unitary structure of a suitable plastic material such as polypropylene or the like. In the illustrated embodiment, the rake head body 12 is illustrated as being of a conventional radially-shaped rake head, but other shapes could also be used. Moreover, the particular details of the rake head body 14 are not generally affected by the invention, except as indicated. The rake head body 14 includes a forward end 18 gently merging into a shaped opposed side members 18a and 18b which together merge into a handle-engaging portion 20. The handle-engaging portion 20 defines a threaded form (not shown) for mating with a like thread form on a handle 24. The forward end 18 of the rake head body 12 terminates in a tine-engaging portion 26 which includes tine coupling assembly or means 16 for removably securing each of the plurality of tines 14.

The rake head assembly 10 includes a stiffening member 28 or means which is made from a continuous length or loop of heavy spring metal. The stiffening member can be like that more particularly described in copending application Ser. No. 07/501,771 filed Mar. 30, 1991 and does not form an aspect of the present invention. In this regard, the rake head body 12 includes projections 30 which extend into body openings 32 for connection to the stiffening member 28. It will be appreciated that the present invention is not related to the above type of stiffening member or its connection to the rake head. It will be understood that a wide variety of rake stiffening spring members and connections to a rake head body can be used.

Figure 2:
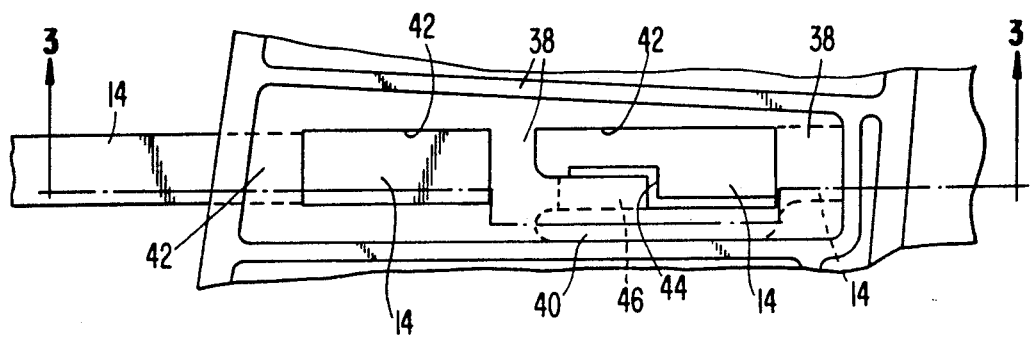
FIG. 2 is an enlarged and fragmented top view of the tine secured to the rake head assembly.
Figure 3:
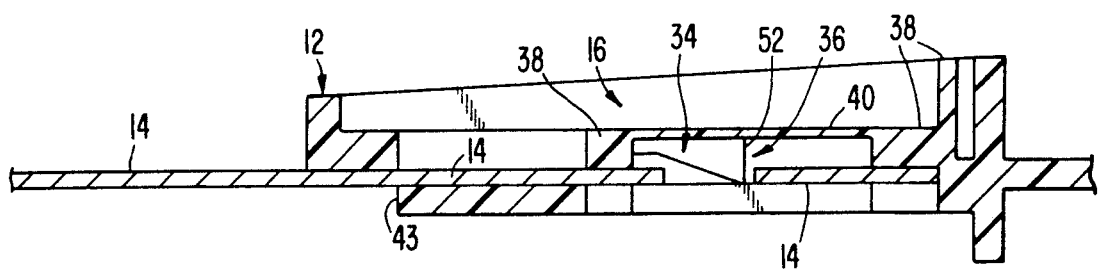
FIG. 3 is a cross-sectional view along section lines 3—3 in FIG. 2.
Figure 4:
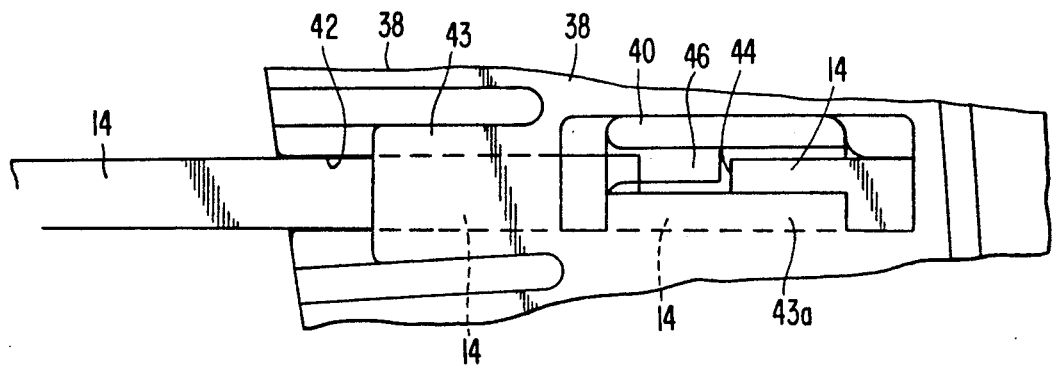
FIG. 4 is a bottom view similar to FIG. 2 in showing the engaged tine and rake head assembly.

Referring now to FIGS. 2–4, there is illustrated the improved coupling means 16. As depicted, the coupling means 16 includes a ramping means 34 and a locking means 36. As shown in FIG. 2, the rake head body 12 includes a plurality of relatively rigid separating portions 38 and integrally molded thereto a relatively thin and resiliently flexible web portion 40. As viewed in FIG. 4, the rake head body 12 includes a tine resting support 43 and the tine resting lateral projections 43a that support major portions of the tine 14. The combination of the rigid separating portions 38, support 43 and projections 43a define an elongated slot 42. The slot 42 is adapted to slidably receive therein a rearwardmost end portion of one of the tines 14.

As best shown in FIG. 2, the tine 14 includes a generally elongated locking recess or notch 44 formed adjacent the rearwardmost end. Included on the web portion 40 is the ramping means 34 which includes a depending ramp member 46 which is adapted to normally interfere with the path of movement of the tine for purposes which will become apparent; (see FIG. 3). The slot 42 is formed so as to be relatively narrow.

The rearwardmost end of the tine is slid within the slot 42 and engages the ramp member 46. Further inward movement of the tine 14 will cause the resiliently flexible web portion 40 and ramp 46 to rise whereby the rearwardmost edge of the tine slides beneath the deflected ramp member 46 such that when the ramp 40 and locking shoulder 52 of locking means 36 is in registry with the notch the former are resiliently urged by the web portion 40 into the notch. As a consequence thereof, the shoulder 52 is fixedly secured to the rake body and cannot be dislodged therefrom unless the ramping means is dislodged as by means of a suitable tool, such as a screwdriver. It will be noted that the rearwardmost end of the tine abuts the rake head to limit movement in one direction while the ledge limits movement of the tine in the opposite direction. Because the tine engaging coupling means 16 of the present invention is formed integrally with the rake head member, the tine coupling means is very inexpensively formed. Additional advantages are that the tine 14 does not have to be bent or deflected in order to be inserted into the rake head assembly. Accordingly, tines having greater columnar rigidity can be used.

With a rake head assembly 10 of the above noted type as shown, it will be appreciated that the rake head body 12 and replaceable tines 14 can be made of other shapes so long as the rake head 12 is provided with a resiliently flexible coupling means 16 to achieve the desired releasable and secure retention of the tines. Accordingly, the rake head is arranged and constructed to as to easily facilitate the removal and replacement of the tines thereto.

From the foregoing description, it can be seen that there has been provided a rake head construction which is capable of being economically formed by molding such that the rake head body can easily and securely replaceably hold for replacement purposes a plurality of tines.

While there is described a specific embodiment of the invention, those skilled in the art will understand that changes may be made in the form of the invention covered by the claims appended hereto without departing form the scope and spirit thereof, and the certain features of the invention may sometimes be used to an advantage without corresponding use of other features. Thus, the embodiments of the invention in which an exclusive property or privilege is claimed are defined in the appended claims.

What is claimed is:

1. A lawn rake head assembly comprising:
a rake body assembly;
a plurality of tines, each one being formed with a locking recess and being held in spaced relationship to each other by said rake body assembly;
said body assembly including a handle receiving portion formed in said body assembly for a rake handle;
said rake body assembly including a body portion which includes channel means for defining a plurality of slots for the slidable reception of individual tines therein; and
said body portion also including resiliently flexible coupling means associated with each of said slots for releasably and separately retaining therein each of said tines; and
said coupling means including ramping means and locking means, said ramping means including a ramp surface which, upon engagement with said tine during its insertion in said slot, is deflected along with said locking means so that it rides over the tine until said locking means falls into said locking recess on the tine, thereby releasably locking said tine to said rake body.

2. The rake head assembly of claim 1 wherein said coupling means includes a resiliently flexible web portion which is integrally connected to said ramp surface.

3. The rake head assembly of claim 2 wherein said locking means includes a locking shoulder integrally connected to said ramp surface.

4. The rake head assembly of claim 3 wherein said body assembly includes stop means for limiting movement in one direction of said tine in said slot.

5. The rake head assembly of claim 4 wherein said locking recess is defined by an elongated notch.

6. A lawn rake comprising:
a rake head assembly including a rake body assembly and a handle receiving portion formed in said body for a rake handle; and
a plurality of tines, each one being formed with a locking recess and being held in spaced relationship to each other by said rake body assembly;
a rake handle coupled to said handle receiving portion;
said rake body assembly including a body portion which includes channel means for defining a plurality of slots for the slidable reception of individual tines therein; and
said body portion also including resiliently flexible coupling means associated with each of said slots for releasably and separately retaining therein each of said tines; and
said coupling means including ramping means and locking means, said ramping means including a ramp surface which, upon engagement with said tine during its insertion in said slot, is deflected along with said locking means so that it rides over the tine until said locking means falls into said locking recess on the tine, thereby releasably locking said tine to said rake body.

7. The lawn rake claim 6 wherein said coupling means includes a resiliently flexible web portion which is integrally connected to said ramp surface.

8. The lawn rake of claim 7 wherein said locking means includes a locking shoulder integrally connected to said ramp surface.

9. The lawn rake of claim 8 wherein said body assembly includes stop means for limiting movement in one direction of said tine in said slot.

10. The rake head assembly of claim 19 wherein said locking recess is defined by an elongated notch.

* * * * *